United States Patent [19]
Richard

[11] Patent Number: 4,948,064
[45] Date of Patent: Aug. 14, 1990

[54] UNIVERSAL SPOOL SUPPORT SYSTEM

[76] Inventor: Neil Richard, 1234 New Haven Ave., Milford, Conn. 06460

[21] Appl. No.: 286,233

[22] Filed: Dec. 19, 1988

[51] Int. Cl.$^5$ ............................................. B65H 49/00
[52] U.S. Cl. ................................. 242/106; 242/129.5; 242/129.51; 242/129.8
[58] Field of Search ................ 242/106, 129.5, 129.51, 242/129.6, 129.8

[56] References Cited

U.S. PATENT DOCUMENTS

| | | | |
|---|---|---|---|
| 2,445,534 | 7/1948 | Musso | 242/129.51 |
| 2,523,806 | 9/1950 | Bohne | 242/129.51 |
| 3,026,059 | 3/1962 | Dennler | 242/106 |
| 3,685,761 | 8/1972 | Zelinski | 242/106 X |
| 3,705,698 | 12/1972 | Newman et al. | 242/129.51 |
| 3,951,354 | 4/1976 | Bagby | 242/106 X |
| 3,973,741 | 8/1976 | Dean | 242/106 X |
| 3,998,402 | 12/1976 | Christensen et al. | 242/106 |
| 4,151,966 | 5/1979 | Lindsay | 242/106 |
| 4,540,136 | 9/1985 | Rauch | 242/106 |
| 4,776,527 | 10/1988 | Prowant | 242/129.5 X |

Primary Examiner—John Petrakes
Assistant Examiner—Steven M. duBois
Attorney, Agent, or Firm—Mattern, Ware, Stolta & Fressola

[57] ABSTRACT

By providing spool supporting plates which are moveably positionable relative to each other, a universal product bearing spool support system is attained. Preferably, the support plates also incorporate a plurality of aligned shaft receiving holes, thereby enabling the support system to accommodate spools of alternate diameters, as well as spools of any length. Furthermore, spool rotation control means are provided along with a universal securement system for mounting the spool support system in any desired location.

17 Claims, 2 Drawing Sheets

UNIVERSAL SPOOL SUPPORT SYSTEM

TECHNICAL FIELD

This invention relates to product bearing spool support systems capable of supporting spools of substantially any size, and more particularly, to fishing line spool support systems for use in transferring fishing line from a supply spool to a fishing reel.

BACKGROUND ART

Spool support systems have been commonly employed to rotationally mount spools bearing such diverse products as fishing line, wire, rope, string, chains, etc. In spite of this wide variety of products, prior art spool support systems have failed to satisfy all of the user's needs and requirements. This failure is particularly apparent with fishing line spool support systems, wherein failures typical to all product-bearing spools are found.

In order to assure that a fishing reel contains the precise type of fishing line needed for the type of fish being sought, fishermen have often purchased various types of fishing line in bulk on large spools. Then, depending upon the particular fish being sought at any time, the fishing line is transferred from the spool to the fishing reel for use.

Although many individuals attempt to transfer the fishing line from the supply spool to the fishing reel by merely mounting the spool on an elongated rod or dowel, such an arrangement is undesirable, due to various unwanted problems that are typically encountered. In particular, the fishing line being loaded onto the fishing reel should be transferred under a particular, desired tension, so that the supply of fishing line on the reel will be tight and compact. In addition, the supply spool should be mounted in a single, fixed position so that the fishing reel can be loaded with the fishing line in a straightforward, uniform manner, thereby preventing unwanted kinks or improperly overlapped or coiled arrangements.

Although various prior art attempts have been made to satisfy these requirements for transferring fishing line to a fishing reel, these prior art attempts have failed to meet all of the requirements. Furthermore, these prior art systems have failed to provide a single, universal support system which is capable of accommodating numerous alternate spool sizes.

Another difficulty typically encountered with prior art structures is the inability to provide a reliable and easily employable clutch plate or friction plate which enables the user to control the rotation of the spool during the loading operation. Although various attempts have been made in the prior art systems to meet this requirement, these prior art systems are incapable of providing repeatable, reliable control.

Therefore, it is a principal object of the present invention to provide a product bearing spool support system which is universally employable for substantially all product bearing spool sizes and configurations.

Another object of the present invention is to provide a universal product bearing spool support system having the characteristic features described above which is easily adjusted to repeatedly and reliably control the speed of rotation of the spool during the product bearing transferral operation.

Another object of the present invention is to provide a universal product bearing spool support system having the characteristic features described above which is mountable to virtually any location, quickly and easily.

Another object of the present invention is to provide a universal product bearing spool support system having the characteristic features described above which is also securely mountable in any desired orientation.

Other and more specific objects will in part be obvious and will in part appear hereinafter.

SUMMARY OF THE INVENTION

The present invention overcomes all of the prior art drawbacks by providing a universally adjustable spool support system which is capable of accommodating spools of virtually any diameter, as well as spools of any length. In the preferred construction, two, juxtaposed, spaced, cooperating support plates are interconnected by separate, cooperating interlocking arm members which allows the support plate to be positioned relative to each other in virtually any desired spaced distance. Consequently, the universal spool support system of the present invention is capable of securely supporting product bearing spools of any particular overall length, as well as accommodating two or more spools simultaneously.

Furthermore, the universal spool support system of the present invention also incorporates a plurality of support shaft receiving holes so as to accommodate product bearing spools of varying diameters. In this way, depending upon the particular diameter spool required, the precise support hole designed to accommodate the particular spool diameter can be employed so that spools of any diameter can be securely affixed to the universal spool support system of the present invention.

In addition, the universal spool support system of the present invention also incorporates a positive, reliable, and easily adjusted spool rotation control means to assure that the supply spool rotates with the precisely desired drag or degree of freedom, so that the product being transferred possesses the precisely desired tension level.

In the preferred embodiment, the rotation control means comprises friction plates or clutch plates adjacent both end walls of the product bearing spool, with at least one of the friction plates being directly controlled by adjustment means for changing the frictional engagement of the clutch plates with the walls of the spool.

Finally, the universal spool support system of the present invention also incorporates a mounting system which allows the entire universal spool support system of the present invention to be securely affixed in any desired location or orientation. In addition, multiple adapters are incorporated into the mounting system in order to allow the universal support system of the present invention to be clamped directly to various mounting spots or directly affixed into alternate mounting locations, where clamp means are incapable of being employed.

The invention accordingly comprises the teaching of construction, combination of elements, and arrangement of parts which will be exemplified in the constructions hereinafter set forth, and the scope of the invention will be indicated in the claims.

THE DRAWINGS

For a fuller understanding of the nature and objects of this invention, references should be had to the following detailed description, taken in connection with the accompanying drawings in which.

DETAILED DESCRIPTION

Figure 1:
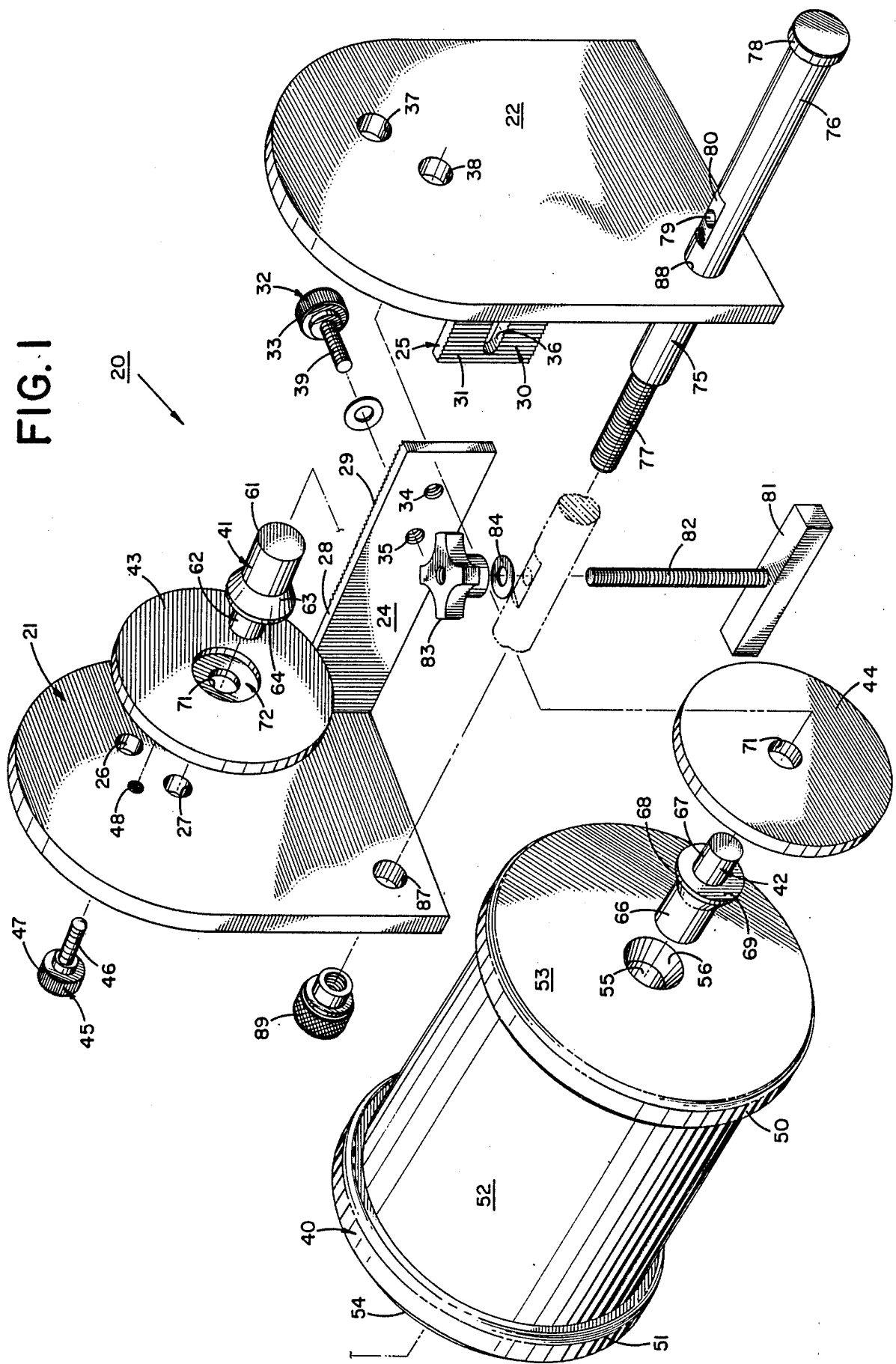
FIG. 1 is an exploded perspective view of the universal spool support system of the present invention.

In FIGS. 1-5, the preferred embodiment of universal spool support system 20 of the present invention is shown, supportingly maintaining a conventional fishing line spool. As will be apparent to one of ordinary skill in the art, the universal spool support system of the present invention is employable with all product-bearing spools. However, for convenience of explanation, and not intending to be limited thereto in any way, the following disclosure details the spool support system of this invention in conjunction with fishing line spools.

As shown in the figures, spool support system 20 comprises juxtaposed, spaced, facing spool support plates 21 and 22. In addition, support plate 21 incorporates a connecting arm 24 extending substantially perpendicularly from one edge of support plate 21, while support plate 22 incorporates a mating, connecting arm 25 extending from one edge of plate 22.

In the preferred embodiment, support plate 21 and connecting arm 24 are welded together in order to form a single, unitary component, while support plate 22 and connecting arm 25 are similarly welded together in order to form a second component. In this way, spool supporting plates 21 and 22 are movably adjustable relative to each other for juxtaposed, spaced cooperating relationship in order to accommodate a fishing line bearing spool of any overall length.

Furthermore, in order to facilitate and assure that support plates 21 and 22 are securely locked in any precisely desired position relative to each other, connecting arm 24 incorporates a rear surface 28, having a substantial portion thereof formed as a serrated toothed zone 29. Similarly, mounting arm 25 comprises a forward facing surface 30, having a substantial portion thereof formed as a cooperating serrated tooth zone 31.

Figure 3:
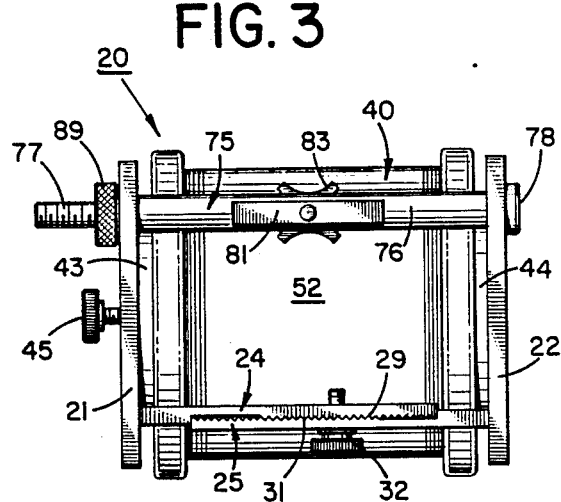
FIG. 3 is a bottom plan view of the universal spool support system of FIG. 2 shown unmounted.
Figure 5:
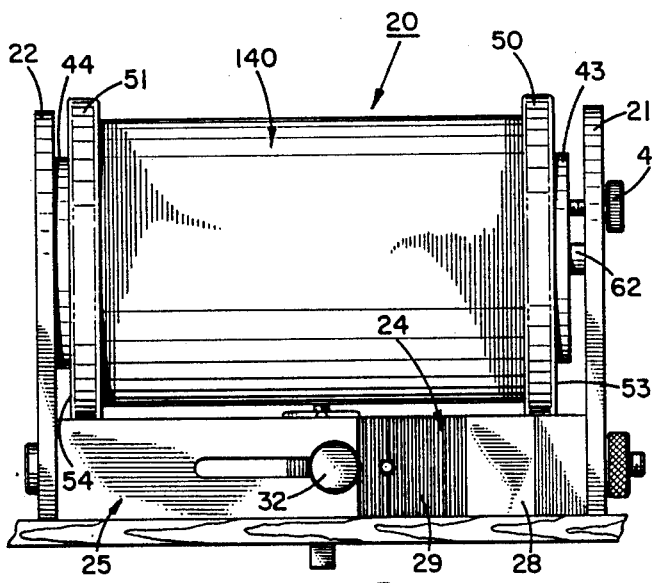
FIG. 5 is a rear elevational view of the spool support system of the present invention shown securely supporting a large spool.

In this way, as best seen in FIGS. 3 and 5, serrated tooth zones 29 and 31 matingly, lockingly engage in a plurality of alternate positions to allow support plates 21 and 22 to be adjustably positioned with any particular, desired, spaced distance therebetween. In FIG. 3, spool 40 comprises a typical fishing line bearing spool having a typical length, and is depicted securely mounted in support system 20. FIG. 5 depicts a fishing line bearing spool 140 which is substantially longer than spool 40. However, as shown, spool 140 is also securely mounted to universal support system 20.

In order to securely lock support plates 21 and 22 in a particular desired spaced distance to accommodate a spool of any length, clamp means 32 is employed along with receiving holes 34 and 35, which are formed in arm 24. Clamp means 32 preferably comprises a finger adjustment knob portion 33 and a threaded shank portion 39. Shank portion 39 threadedly engages with either receiving hole 34 or 35 to securely clamp arms 24 and 25 together. Preferably, an elongated slot 36 is formed in arm 25 in order to slidingly accommodate the shank portion 39 of clamp means 32 and allow final precise adjustment of the spacing between plates 21 and 22.

By employing this construction, clamping means 32 is threadedly engaged in either receiving hole 34 or 35 of arm 24, while support plate 22 and arm 25 are freely movable relative to plate 21 within slot 36 of arm 25. Once the specifically desired spaced distance has been obtained, clamping means 32 is merely tightened, bringing serrated teeth 31 and 29 into secure interlocked engagement. Once clamped, support plates 21 and 22 are securely affixed relative to each other with the precisely desired spaced distance therebetween.

In order to rotationally support the desired fishing line bearing spool, support plate 21 comprises at least two shaft receiving holes 26 and 27 formed therein. Shaft receiving holes 26 and 27 are positioned to receive and securely supportingly retain a portion of the shaft on which the fishing line spool is rotationally mounted.

Similarly, support plate 22 incorporates shaft receiving holes 36 and 38 in juxtaposed, spaced, aligned relationship with shaft receiving holes 26 and 27 of support plate 21. In this way, the ends of the supporting shaft for the fishing line spool are securely mounted in order to allow the fishing line spool to rotate about the shaft thereof.

Furthermore, at least two shaft receiving holes are preferably formed in each of the support plates in order to accommodate fishing line spools of varying diameters. In this way, alternate aligned pairs of receiving holes would be employed, depending upon the particular diameter of the fishing line spool to be rotationally mounted to universal spool support system 20.

Figure 4:
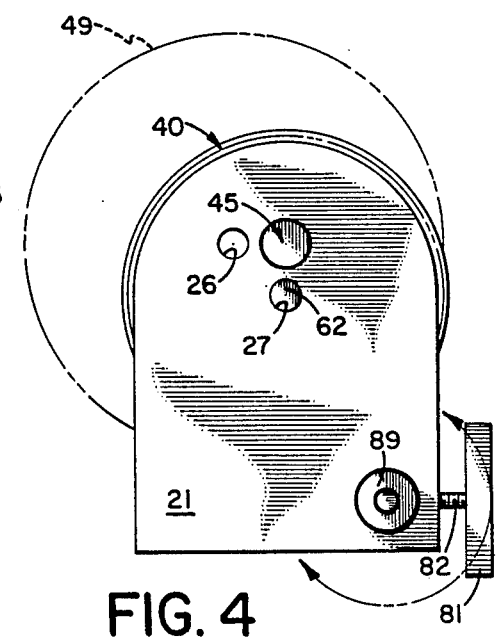
FIG. 4 is a side elevational view of the universal spool support system of FIG. 2.

In the embodiment shown in the FIGS., cooperatingly aligned shaft receiving holes 27 and 38 would be employed for spools of smaller diameters, while cooperating aligned holes 26 and 37 would be employed for spools of larger diameters. As shown in FIG. 4, spool 40 comprises a small diameter and is rotationally mounted to support plate 21 in hole 27. However, in order to secure mount spools of large diameters, such as spool 49 shown in phantom, receiving hole 26 is employed. As is readily apparent to one of ordinary skill in the art, additional shaft receiving holes may be formed in support plates 21 and 22 in order to accommodate spools of any particular dimensions.

In the preferred embodiment, fishing line spool 40 is rotationally mounted to universal spool support system 20 of the present invention by employing two independent spool supporting axle rods 41 and 42. In addition, a friction plate or clutch plate 43 is mounted to axle rod 41 between spool 40 and support plate 21, while a friction plate or clutch plate 44 is mounted to axle rod 42 between spool 40 and support plate 22.

If desired, a single elongated shaft can be employed to rotationally mount spool 40 to support system 20. However, the use of two separate axle rods is preferred, in order to avoid having to employ a plurality of shafts of alternate lengths.

In the preferred embodiment, a friction adjustment knob 45 is employed in conjunction with clutch plates 43 and 44. Adjustment knob 45 incorporates a threaded shaft portion 46 and a head portion 47 and cooperatingly engages threaded receiving hole 48 of support plate 21.

Figure 2:
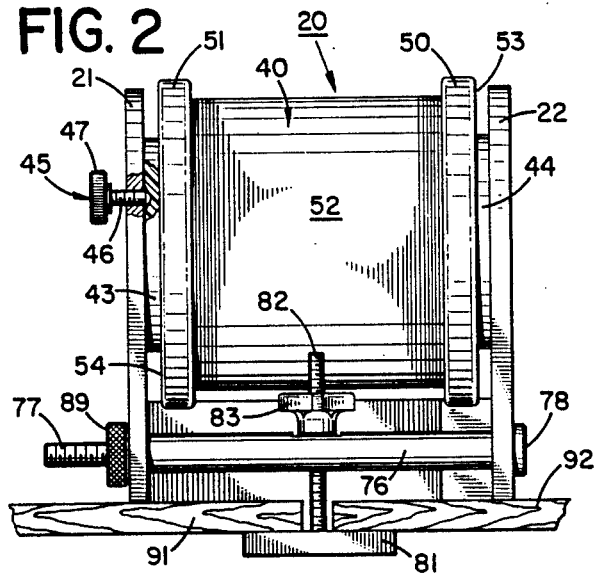
FIG. 2 is a front elevational view of the universal spool support system, partially broken away, showing a smaller size spool securely mounted therein, with the entire system mounted to conventional wooden planks.

As best seen in FIGS. 1, 2 and and 5, when adjustment knob 45 is threadedly engaged within receiving hole 48 of support plate 21, the rotation of knob 45 causes the free end of shaft portion 46 to be in movement controlling engagement with clutch plate 43. When fully assembled, fishing line spool 40 is sandwiched between friction plates or clutch plates 43 and 44, with adjustment knob 45 in movement controlling engagement with clutch plate 43.

In this way, the user is capable of complete control over the rotational speed of spool 40 during the fishing line transferral operation. By rotating adjustment knob 45 in one direction, frictional contact between clutch plates 43 and 44 and spool 40 is increased. Then, by rotating knob 45 in the opposite direction, the frictional forces are decreased. As a result, the precisely desired frictional drag can be easily attained, so that spool 40 will rotate with the desired degree of freedom.

Fishing line bearing spool 40 is depicted as comprising terminating end flanges 50 and 51, with the particularly desired fishing line 52 mounted therebetween. Flange 50 comprises a terminating end surface 53, while flange 51 similarly comprises a terminating end surface 54.

In addition, spool 40 comprises a shaft receiving bore 55, which extends through spool 40 from end surface 53 to 54. Furthermore, shaft receiving bore 55 terminates at both ends thereof in a tapered, enlarged receiving hole 56. In this way, the positioning of a support shaft or axle rod in receiving hole 55 of spool 40 is facilitated.

In order to assure that fishing line bearing spool 40 is mounted to support plates 21 and 22 in a manner which assures controlled, wobble-free rotation of spool 40 relative to support plates 21 and 22, spool supporting axle rods 41 and 42 each comprise a dual diameter construction with an intermediate spool engaging flange portion formed thereon.

As best seen in FIG. 1, spool supporting axle rod 41 incorporates a first cylindrically shaped section 61 having a diameter which is slightly less than the diameter of shaft receiving bore 55 of spool 40. In addition, spool supporting axle rod 41 also incorporates a second cylindrically-shaped section 62 which comprises a diameter adapted for cooperative, journaled interengagement with shaft receiving holes 26 and 27 of support plate 21.

Spool supporting axle rod 41 also incorporates an intermediate, conically shaped flange portion 63 which is positioned between section 61 and section 62, and is constructed for mating engagement with tapered hole 56 of spool 40. In the preferred embodiment, flange portion 63 is constructed for nested engagement in tapered hole 56, thereby assuring that terminating edge 64 of flange portion 63 is substantially co-extensive with end surface 54 of spool 40, and that spool 40 is securely mounted therewith free of unwanted shifting or wobbling.

Similarly, spool supporting axle rod 42 comprises a first cylindrically-shaped section 66 constructed for sliding interengagement with shaft receiving bore 55 of spool 40, and a second, cylindrically-shaped section 67 constructed for journaled interengagement with shaft receiving holes 37 or 38 of support plate 22. Finally, spool supporting axle rod 42 comprises an intermediate, conically-shaped flange portion 68 positioned between shaft 66 and 67, which is constructed for mating engagement with tapered hole 56 of spool 40. In the preferred embodiment, flange portion 68 is constructed for nested engagement in tapered hole 56, thereby assuring that terminating edge 69 of flange portion 63 is substantially co-extensive with end surface 53 of spool 40 and spool 40 is mounted therewith free of wobbling or shifting.

By employing spool supporting axle rods 41 and 42, fishing line bearing spool 40 is quickly and easily rotationally mounted to universal spool support system 20 of the present invention. In addition, since most fishing line bearing spools comprise identically sized shaft receiving bores, spool supporting axle rods 41 and 42 can be employed for most spools, regardless of the overall size and shape.

Prior to mounting second, cylindrically shaped section 62 of axle rod 41 into shaft receiving hole 26 or 27, friction plate 43 is mounted to second section 62 through rod receiving hole 71. In addition, friction plate 43 comprises a recess zone 72 concentrically aligned with rod receiving hole 71 and having a diameter slightly greater than the diameter of tapered, conically shaped intermediate section 63. In this way, any axial movement of rod 41 can be accommodated, while maintaining a major portion of the surface of friction plate 43 in direct frictional engagement with end surface 54 of spool 40.

Similarly, friction plate or clutch plate 44 is mounted to second section 67 of shaft supporting axle rod 42 by employing rod receiving hole 71 of friction plate 44. In addition, friction plate 44 incorporates a similar recess zone 72 concentrically aligned with rod receiving hole 71 in order to accommodate any axial movement of intermediate flange section 68.

As discussed above, friction plates or clutch plates 43 and 44 provide the user with the desired spool rotation control during the dispensing of fishing line 52 from spool 40. As best seen in FIGS. 2 and 5, the user can quickly and easily adjust the friction forces upon end surfaces 53 and 54 of spool 40 by rotating control knob 45.

By rotating knob 45 in one direction, the free end of threaded portion 46 is advanced into engagement with clutch plate 43 forcing clutch plate 43 into increased frictional engagement with end surface 54 of flange 51 of spool 40. Simultaneously, end surface 53 of flange portion 50 of spool 40 is forced into increased frictional engagement with clutch plate 44. In this way, the user can easily increase the frictional forces clutch plates 43 and 44 impart to the end surfaces 53 and 54 of spool 40 in order to slow the rotation of spool 40 while fishing line 52 is being dispensed therefrom.

Clutch plates 43 and 44 may comprise any suitable material which would provide the desired frictional controlled engagement with end surfaces 53 and 54 of spool 40. Preferably, clutch plates 43 and 44 are formed from fiber reinforced plastic material, due to the inherent strength of this material. However, any suitable material may be employed. In addition, if desired, the surfaces of clutch plates 43 and 44 which contact end surfaces 53 and 54 of spool 40 may comprise a surface having a high co-efficient of friction, in order to further enhance the precise rotational control of spool 40.

In attaining the desired rotational control of spool 40, it may be found during use that the frictional drag on spool 40 is greater than desired. In this instance, adjustment knob 45 is merely rotated in an opposite direction, thereby reducing the frictional engagement between clutch plates 43 and 44 and spool 40 and allowing spool 40 to rotate more freely. As a result, by employing adjustment knob 45, the precisely desired frictional control and rotational speed of spool 40 is easily attained.

The construction of the preferred embodiment of universal spool support system 20 of the present invention is completed by incorporating system securement means 75. As best seen in FIGS. 1 and 2, system securement means 75 comprises an elongated substantially cylindrically shaped shaft 76 which incorporates a threaded section 77 at one end thereof. At the opposed end of shaft 76 is an enlarged terminating flange or head 78.

Shaft 76 also incorporates a through hole 79 which is mounted substantially midway along shaft 76 and extends substantially perpendicularly to the central axis of shaft 76. In the preferred embodiment, through hole 79 terminates in at least one end thereof in a flat zone 80 formed on the outside surface of shaft 76.

In addition, this embodiment of system securement means 75 also incorporates an elongated, substantially rectangular shaped brace or bar 81 and an elongated threaded shaft 82 securely affixed at one end thereof to brace 81. In addition, a knob 83 and washer 84 are employed for mating, threaded engagement with shaft 82.

In order to securely mount elongated shaft 76 of system securement means 75 to universal spool support system 20 of the present invention, support plate 21 comprises a shaft receiving hole 87, while support plate 22 comprises an aligned shaft receiving hole 88. In this way, shaft 76 slidingly passes through receiving holes 87 and 88 with threaded section 77 extending outwardly from support plate 21, while terminating end flange head 78 abuts support plate 22, preventing the axial movement of shaft 76 beyond flange head 78.

In order to securely mount shaft 76 in position, a cap 89 is threadedly engaged with section 77 of shaft 76 and is advanced into secure abutting contact with support plate 21, assuring shaft 76 is mounted in secure engagement with universal support system 20.

In addition, since threaded section 77 of shaft 76 comprises a substantial portion of shaft 76, the secure locked interengaged position of shaft 76 with support system 20 is easily adjusted to any desired overall length. In this way, the adjustability of support plates 21 and 22 relative to each other is accommodated.

Once a particularly desired spaced distance has been attained and the spool has been mounted in place, shaft 76 is easily axially advanced through receiving holes 87 and 88 and securely mounted in position by threadedly engaging cap 89 with threaded section 77 of shaft 76. Once cap 89 has been advanced into engagement with support plate 21, shaft 76 is secured in the precisely desired position.

In order to securely mount universal spool support system 20 of the present invention in any desired location, elongated threaded shaft 82 is passed through receiving hole 79 and captured in this position by threadedly engaging knob 83 onto shaft 82. Then, as best seen in FIG. 2, the entire universal support system 20 can be securely mounted to any desired location, such as a dock, by merely sliding the elongated clamping brace or bar 81 between adjacent dock forming planks 91 and 92, with threaded rod 82 therebetween. Once in position, the entire universal spool support system 20 of the present invention can be securely clamped to planks 91 and 92 by rotationally advancing knob 83 along threaded rod 82 until bar 81 is brought into secure, abutting, clamped engagement with planks 91 and 92. In this way, the entire universal spool support system 20 is quickly and easily securely mounted to the dock or to any other convenient location where elongated clamping bar 81 can be securely affixed.

As shown in FIGS. 1 through 4, system securement means 75 is preferably constructed to allow elongated shaft 76 to rotate relative to support plates 21 and 22. By employing elongated shaft 76 which is securely affixed to support plates 21 and 22 of universal support system 20 by the abutting engagement of flange head 78 and cap means 89, shaft 76 is free to rotate relative to support plates 21 and 22.

In this way, as diagrammatically represented in FIG. 4, clamping bar 81 and threaded shaft 82 are free to rotate through a complete 360° about the axis defined by elongated shaft 76. As a result, clamping bar 81 can be positioned into any desired angular relationship relative to support plates 21 and 22 of universal spool support system 20 in order to securely affix support system 20 to any convenient location. As a result, the secure positioning of universal spool support system 20 of the present invention to horizontal surfaces, vertical surfaces, or angular surfaces can be achieved both conveniently and expeditiously.

Figure 7:
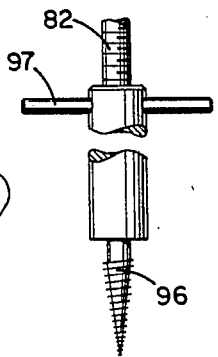
FIG. 7 is a front elevational view, partially broken away, of an alternate embodiment for fastening means employed with the universal spool support system of this invention.

In FIG. 7, an alternate component for use in the securement system of the present invention is depicted. As shown therein, in this embodiment, threaded shaft 82 terminates at one end thereof with a shouldered threaded screw member 96, which incorporates a rod 97 extending substantially perpendicularly to the axis of screw member 96. The opposed end of shaft 82 passes through elongated shaft 76 and is threadedly engaged with knob 83, as previously described.

By employing threaded screw member 96, the universal spool support system 20 of the present invention can be directly mounted to any wooden location, particularly a dock, wherein brace or bar 81 cannot be employed. By using screw means 96 and rod 97, screw means 96 can be quickly and easily fastened to a dock, or other wooden support base. Then, the entire universal support system 20 of the present invention is easily securely affixed to the support base by rotating knob 83 until the entire system is securely clamped in position. In addition, as detailed above, since shaft 76 is free to rotate about its central axis, screw member 96 can be mounted in any desired orientation in order to secure universal spool support system 20 of the present invention wherever convenient for the user.

Figure 6:
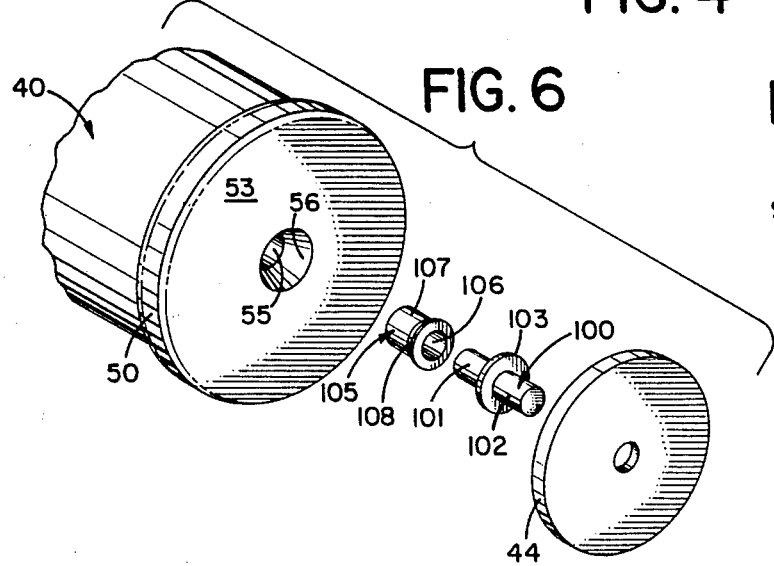
FIG. 6 is an exploded perspective view showing the mounting of a spool using an alternate embodiment of a spool supporting member.

In FIG. 6, an alternate embodiment for the spool supporting members is shown in detail. In this embodiment, axle rod 100 comprises a first, substantially cylindrically shaped shaft portion 101 and a second, substantially cylindrically shaped shaft portion 102, both of which comprise substantially equal diameters. In addition, axle rod 100 incorporates a substantially circular shaped stop abutment 103 positioned midway along axle rod 100.

In the preferred embodiment, the diameter of cylindrically shaped shaft section 101 of axle rod 100 is substantially less than the typical diameter of the shaft receiving bore of most fishing line bearing spools. In the example depicted in FIG. 6, the diameter of section 101 is substantially less than the diameter of shaft receiving bore 55 of spool 40.

In this embodiment, a separate bushing 105 is employed which comprises a shaft-receiving bore hole 106. The shaft receiving bore hole 106 comprises a diameter which is slightly greater than the diameter of shaft section 101 and is constructed for secure mounted engagement with shaft section 101 for rotation thereabout.

In addition, bushing 105 comprises a substantially cylindrical shaped portion 107 having a diameter substantially equal to the diameter of shaft receiving bore 55 of spool 40. Finally, busing 105 comprises a substantially conically shaped tapered section 108 which is dimensioned for mating secure engagement with conical shaft receiving section 56 of spool 40.

By employing this embodiment of the spool supporting member, a single, universal axle rod 100 is attained, which matingly engages with a plurality of alternate bushing members each of which are constructed for dimensional mating interengagement with particular sized spool configurations. In this way, secure, wobble-free, rotational mounted engagement of any spool having any configuration is assured and is quickly and easily attained.

It will thus be seen that the objects set forth above, among those made apparent from the preceding description, are efficiently attained and, since certain changes may be made in the above article, without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the inVention herein described and all statements of the scope of the invention which, as a matter of language, might be said to fall therebetween.

Having described my invention, what I claim is new and desire to secure by Letters Patents is:

1. A support system for rotationally securely retaining a variety of product bearing spools, said support system comprising:
    A. a first support plate,
    B. a second support plate positioned in juxtaposed, spaced, cooperating relationship with the first support plate;
    C. support means for rotationally mounting at least one product bearing spool to the support plates; and
    D. each of the support plates comprising at least two shaft receiving holes, each being aligned with a shaft receiving hole of the opposed support plate, thereby forming at least two pair of juxtaposed, spaced, facing, substantially aligned shaft receiving holes, to enable the support system of the present invention to securely rotationally retain product bearing spools of varying diameters.

2. The support system defined in claim 16 said support system further comprising:
    E. interconnecting means mounted between the first and second support plates, and comprising
        a. a first arm member securely affixed to a free edge of the first support plate,
        b. a second arm member securely affixed to a free edge of the second support plate and positioned for cooperative, overlying relative engagement with said first arm member; and
        c. adjustment means
            1. constructed for controllably altering the distance between the first and second support plate in order to provide the desired spaced distance between said first and second support plates; and
            2. comprising grooved zones formed on juxtaposed, facing surfaces of said arm members to assure locked interengagement of said arm members with each other in any desired position; and
    F. locking means for securing the first and second support plates in any desired relative position;
    E. support means for rotationally mounting at least one product bearing spool to the support plates;
        whereby product bearing spools having any overall length can be quickly and easily securely mounted to the spool support system.

3. The spool support system defined in claim 2, wherein said first arm member of the interconnecting means is further defined as comprising a plurality of screw clamp receiving holes and said second arm member is further defined as comprising an elongated slot formed therein and cooperatively aligned with said threaded receiving holes of said first arm member, and said locking means is further defined as comprising a threaded clamping screw constructed for interengagement with said elongated slot and threaded engagement with said receiving holes for allowing the arm members to be positioned in any desired position and then securely locked in that position by threadedly securely affixing said arm members together by said screw clamp.

4. The spool support system defined in claim 1, wherein said support means is further defined as comprising a pair of rod members each comprising
    a. a first section constructed for mating, sliding engagement within the shaft receiving zone of a spool, and
    b. a second section construction for rotational mounted engagement in one of the shaft holes formed in the support plates, whereby a spool can be quickly and easily mounted to the support system of the present invention and securely maintained in that desired position, ready for trouble-free rotation.

5. The spool support system defined in claim 4, wherein the product bearing spool comprises an elongated bore extending therethrough, said bore terminating at both ends with an enlarged, tapered, conically shaped receiving section and wherein the first section of said rod member is further defined as comprising a conical-shaped portion constructed for mating, abutting, interengagement with the conically-shaped receiving section of the spool, thereby assuring secure, mounted, wobble-free rotational engagement of the spool on the rod members.

6. The spool support system defined in claim 1, wherein said support system further defined as comprising:
    a. a pair of rod members, each of said rod members comprising 1. a substantially cylindrically shaped elongated shaft having a diameter constructed for rotational mounted engagement in one of the shaft-receiving holes formed in the support plates, and
2. an abutment wall positioned substantially midway along said elongated shaft, and b. a pair of bushings
1. each being slidingly mountable to the shaft of one of the rod members for overlying, rotational engagement therewith,
2. one end of each bushing being in contact with the abutment wall of the rod member, and
3. the outer diameter of each bushing being constructed for mating, sliding, interengagement with the receiving hole of a spool to assure secure mounted trouble-free rotational supporting engagement of the bushing with that end of the spool, whereby any spool with any particular shaft configuration can be quickly and easily mounted to said support means by providing a suitable bushing for secure, retained mounted engagement of said spool therewith.

7. The spool support system defined in claim 2, wherein said support system further comprises
F. at least one friction plate rotationally mounted to the support means between the spool and one of the support plates; and
G. friction adjustment means cooperatingly associated with the friction plate for controlling the frictional forces on the spool in order to attain the desired freedom of rotation thereof.

8. The spool support system defined in claim 7, wherein said support system is further defined as comprising two friction plates, each positioned between one end of the spool and one of the support plates, thereby further enhancing the control over the rotational freedom of the spool o he precisely desired level.

9. The spool support system defined in claim 2, wherein said system further comprises:
F. clamping means for securely mounting the entire spool support system to any desired convenient location, said clamping means being rotationally movable relative to the support plates, allowing the clamping means to be pivoted into any desired orientation for secure, clamped mounted engagement of said support system to any desired location and in any desired position.

10. The spool support system defined in claim 9, wherein said clamping means is further defined as comprising:
a. an elongated bar rotationally mounted between said first and second support plates,
b. an elongated shaft securely mounted to the elongated bar substantially perpendicular to the central axis of said bar,
c. a clamping brace affixed to one end of the shaft and positioned for secure mounted engagement with any desired surface, and
d. securement means associated with the opposed end of the elongated shaft for securely affixing the clamping brace to any desired position relative to the elongated bar,
   whereby the clamping brace is rotationally movable about the central axis of said elongated bar, allowing the clamping brace to be moved into any desired axial position relative thereto in order to be securely affixed with any desired support member in any desired position.

11. A support system for rotationally securely retaining a variety of product bearing spools, said support system comprising:
A. a first support plate,
B. a second support plate positioned in juxtaposed, spaced, cooperating relationship with the first support plate;
C. support means for rotationally mounting at least one product bearing spool to the support plates; and
D. clamping means for securely mounting the entire spool support system to any desired convenient location, said clamping means being
a. rotationally movable bout a first axis of rotation relative to the support plates, and
b. rotationally movable about a second axis of rotation angularly disposed relative to the first axis of rotation,
   thereby allowing the clamping means to be pivoted into any desired orientation for secure, clamped mounted engagement of said support system to any desired location and in any desired position.

12. The spool support system defined in claim 11, wherein said clamping means if further defined as comprising:
a. an elongated bar rotationally mounted between said first and second support plates,
b. an elongated shaft securely mounted to the elongated bar substantially perpendicular to the central axis of said bar,
c. a clamping brace affixed to one end of the shaft and positioned for secure mounted engagement with any desired surface, and
d. securement means associated with the opposed end of the elongated shaft for securely affixing the clamping brace to any desired position relative to the elongated bar,
   whereby the clamping brace is rotationally movable about the central axis of said elongated bar, allowing the clamping brace to be moved into any desired axial position relative thereto in order to be securely affixed with any desired support member in any desired position.

13. The clamping means defined in claim 12, wherein said elongated shaft is further defined as being threaded and said securement means is further defined as a handle member threadedly engaged with said threaded shaft and mounted for bracing, clamping engagement with the elongated bar.

14. The clamping means defined in claim 12, wherein said clamping brace is further defined as comprising threaded screw means mounted for being securely threadedly engaged with any desired location for mounting the support system thereto.

15. The support system defined in claim 11, wherein the clamping means is further defined as having a first axis of rotation substantially perpendicular to the support plates and a second axis of rotation substantially perpendicular to the first axis of rotation.

16. A spool support system for rotationally securely retaining a variety of product bearing spools, said support system comprising:
A. a first support plate,
B. a second support plate positioned in juxtaposed, spaced, cooperating relationship with the first support plate;

C. support means for rotationally mounting at least one product bearing spool to the support plates;
D. at least one friction plate rotationally mounted to the support means between the spool and one of the support plates;
E. one of said support plates being further defined as comprising a threaded, screw-receiving hole formed therein; and
F. friction adjustment means
   a. cooperatingly associated with the friction plate for controlling the frictional forces on the spool in order to attain the desired freedom of rotation thereof; and
   b. comprising an elongated, threaded screw member, threadedly engaged within said receiving hole of said support plate, whereby rotation of said screw in a first direction axially advances the base of the screw into direct contact with one of said friction plates, thereby increasing the frictional contact between the frictional plate and the spool, and controllably reducing the rotational freedom of the spool.

17. The spool support system defined in claim 6, wherein said first support plate and said second support plate each comprise at least two shaft receiving holes, each being aligned with a shaft receiving hole formed in the opposed support plate, thereby forming at least two pair of juxtaposed, spaced, facing, substantially aligned shaft receiving holes for enabling the support system of the present invention to securely rotationally retain product bearing spools of varying diameters.

* * * * *